United States Patent [19]

Liedloff et al.

[11] Patent Number: 5,807,972
[45] Date of Patent: Sep. 15, 1998

[54] POLYCAPROLACTAM WITH NOVEL CHAIN REGULATION

[76] Inventors: Hanns-Jörg Liedloff, Via Caguils 16A; Ernst Morf, Via Gletsch 9; Gerhard Schmidt, Via Calundis 19, all of CH-7013 Domat/Ems, Switzerland

[21] Appl. No.: 849,781
[22] PCT Filed: Sep. 30, 1996
[86] PCT No.: PCT/EP96/04279
  § 371 Date: Aug. 25, 1997
  § 102(e) Date: Aug. 25, 1997
[87] PCT Pub. No.: WO97/13800
  PCT Pub. Date: Apr. 17, 1997

[30] Foreign Application Priority Data

Oct. 9, 1995 [DE] Germany .................. 197 37 614.5

[51] Int. Cl.$^6$ .................................................. C08G 69/28
[52] U.S. Cl. .................. 528/336; 528/182; 528/183; 528/193; 528/207; 528/208

[58] Field of Search .................... 528/182, 183, 528/193, 207, 208, 336

[56] References Cited

U.S. PATENT DOCUMENTS 4,720,538  1/1988  Bartmann ................. 528/336

*Primary Examiner*—Terressa Mosley
*Attorney, Agent, or Firm*—Hardaway Law Firm, P.A.

[57] ABSTRACT

The invention is directed to a hydrolytically polymerized polycaprolactam with new chain regulation, whereby the polymerization of caprolactam (I) is carried out with 0.1–0.7 weight percent of an aromatic dicarboxylic acid (II), 0.01–0.7 weight percent of an aliphatic or cycloaliphatic diamine (III) that carries a primary and a tertiary amino group, and/or 0.01–0.7 weight percent 4-amino-2,2,6,6-tetraalkyl piperidine (IV), whereby the quantities of constituents I through IV add up to 100 weight percent and the quantity of the constituents III and/or IV amounts to 0.01–0.7 weight percent.

8 Claims, No Drawings

POLYCAPROLACTAM WITH NOVEL CHAIN REGULATION

BACKGROUND OF THE INVENTION

The present invention is directed to the subject matter indicated in the patent claims. More particularly, the invention is directed to a new and improved polycaprolactam (PA-6) with novel chain regulation.

Low-viscosity to medium-viscosity polycaprolactam (PA-6) for the production of injection molding compounds or fibers is usually produced by polymerization of caprolactam upon co-employment of chain regulators, such as acetic acid or other monocarboxylic acids. The molecular weight of the PA-6 is set to the desired value in this way and the viscosity stability of the PA-6 melt during processing is assured at the same time. By low-viscosity to medium-viscosity PA-6 is meant herein extracted products, i.e. products largely freed of caprolactam having a relative solution viscosity from about 1.65 to about 1.95, as measured in a 0.5 weight percent solution in m-cresol at 20° C.

In addition to requiring a high processing stability, the production of fibers requires a defined and constant amino end group concentration in order to assure a good dye affinity. In order to achieve good results in the coloring with, for example, acidic colorants soluble in PA-6, the amino end group concentration in the fibers should ideally amount to 40–50 meq/kg.

The conditions are different given the injection molding modifications of low-viscosity through medium-viscosity PA-6 insofar as there are a number of products here that can be produced with good quality only given significantly lower amino end group concentrations of 25–30 meq/kg of the PA-6 utilized.

The following products or, respectively, product groups are among those included among these PA-6 injection molding materials:

1. Impact-Resistant PA6(Co)Polyolefin Mixtures having two-phase morphology whose (co)polyolefin component is grafted with unsaturated carboxylic acids or, respectively, carboxylic acid derivatives or is chemically modified in some other way. Typical modification agents are, for example, (meth)acrylic acid and the esters thereof or maleic anhydride. For example, ethylene/propylene/(diene)-copolymers (EPDM), linear low density polyethylene (LLDPE) or other types of polyethylene are employed as (co)polyolefins.

It is in fact recommended—for example, in U.S. Pat. No. 4,945,129 —to employ PA-6 with comparatively high $NH_2$-group concentration for such blends; the possible gain in impact strength or, respectively, notch impact strength is then at the expense of the injection molding processability. In particular, an extension of the cycle times and, thus, an extension of the productivity must be accepted when processing such materials. In addition to this, problems arise given pigmented materials, these being expressed in the non-uniformity of the pigment dispersion at the surfaces of the finished parts.

An acceptable balance of the aforementioned properties is only achieved by employing PA-6 having a comparatively low $NH_2$-group concentration (25–30 meq/kg).

2. Flame-Retardant PA-6 that is modified with specific nitrogen compounds. For example, these products, which are added to the PA-6 melt in extruders, include melamine, melamine cyanurate, melamine phosphate and comparable materials.

The combustion behavior of such mixtures is usually tested in the combustion test of Underwriters Laboratories and classified according to the corresponding UL 94 standard.

In order to achieve the best possible classification (VO), PA-6 quality and the quality of the flame-retardant nitrogen compound must be very well matched to one another. An important quality feature of the PA-6 is thereby the aforementioned range of the $NH_2$-group concentration.

It proceeds from the above comments, that the demands made of low-viscosity and medium-viscosity PA-6 for fiber and injection molding purposes cannot be met without further ado with one and the same product with respect to the amino end group concentration. No teachings may be found in the patent literature and other pertinent sources as to how the contrary demands made of fiber and injection molding PA-6 can be achieved with a uniform product.

SUMMARY OF THE INVENTION

The object of the present invention is thus to offer low-viscosity to medium-viscosity PA-6 for fiber and injection molding purposes that equally meets the demands made of both applications.

The object underlying this invention is achieved by providing PA-6 with a novel chain regulator whose manufacture ensues by hydrolytic polymerization, i.e. by water-induced polymerization of caprolactam (I) together with 0.1–0.7 weight percent of an aromatic dicarboxylic acid (II)

0.01–0.7 weight percent of an aliphatic or cycloaliphatic diamine (III) that carries a primary and a tertiary amino group, and/or 0.01–0.7 weight percent 4-amino-2,2,6,6,-tetraalkyl- piperidine (IV), whereby the quantities of constituents I through IV add up to 100 weight percent and the quantity of the components III and/or IV amounts to 0.01–0.7 weight percent.

Terephthalic acid and/or isophthalic acid are preferably employed as aromatic dicarboxylic acids (II), preferably in an amount of 0.2–0.6 weight percent.

The diamino constituent III is preferably selected from the group composed of 3-(dialkylamino)-1-propylamines, 2-(dialkylamino)-1-ethylamines, piperidono- and pyrrolidino-alkylamines and is preferably employed in an amount of 0.01–0.6 weight percent.

Examples of III are 3-(dimethylamino)-1-propylamine and 2-piperidno-ethylamine.

4-amino-2 2,6,6-tetramethylpiperidine is preferred as diamine constituent IV, preferably employed in an amount of 0.01–0.6 weight percent. The quantity of the diamine constituents III and/or IV preferably amounts to 0.05–0.6 weight percent.

DETAILED DESCRIPTION OF THE INVENTION

The manufacture of the inventive PA-6 ensues according to continuous or batched methods long since known. The relationships between quantity of chain controller or regulator, water content of the reaction mixture and temperature management and reaction time on the one hand and caprolactam conversion as well as the molecular weight of PA-6 produced, on the other hand, which are known and have been tested in industrial practice, need not be discussed in greater detail here. Specifically given continuous methods for producing PA-6 in vertically arranged tubular reactors, there are adequate experience that allow the operators of such systems to convert their PA-6 production to the inventive PA-6 with its novel chain regulation without encountering significant problems.

The batchwise production of the inventive PA-6 can also be unproblematically implemented.

It lies at hand that PA-6 constituted in this way yields considerable advantages for the production; the frequency of product conversion can be reduced in this way. The PA-6 manufacturer would like to limit product conversions in the currently standard PA-6 polymerization systems—which are practically exclusively operated according to continuous methods and with throughputs of approximately 50–200 tons daily—to a minimum insofar as possible. Each conversion involves the production of what is referred to as transition material that can amount in quantity to several daily outputs and that is difficult to coordinate with existing products specifications.

The inventive PA-6 with novel chain regulation exhibits the desired properties as initially defined for fiber manufacture and specific injection molding applications. These properties are set forth in greater detail in the examples.

The polymerization of the inventive PA-6 was carried out batchwise in a 130 liter autoclave. To this end, respectively 45 kg liquid caprolactam at 90° C. together with 7 liters of water and the quantities of terephthalic acid and diamines indicated in Table 1 were mixed in an agitatable recipient vessel rendered inert with nitrogen, and the homogeneous mixture was subsequently transferred into said autoclave and polymerized therein under inert conditions ($N_2$). Approximately the following conditions were uniformly observed in the polymerization:

| Stage 1 (pressure phase) | Mass temperature: Pressure: Duration: | 290° C. 20 bar 2 hours |
|---|---|---|
| Stage 2 (relaxation) | Mass temperature: Pressure: Duration: | from 290 to 260° C. from 20 to 1 bar 1.5 hours |
| Stage 3 (degassification) | Mass temperature: Pressure: Entraining gas: Duration: | 260° C. 1 bar Nitrogen 4–6 hours |

When the desired viscosity was reached, the individual batches were pressed out as polymer strands, granulated after passing through a water bath, extracted with water and dried.

The torque indicator of the agitator of the autoclave formed the basis as the criterion for the viscosity of the PA-6 melt.

40 kg of each batch were extracted in 16 hours at 80° C. with 2,400 liters of fresh water per hour. The drying was carried out in a vacuum for 24 hours at 110° C.

The relative solution viscosity of extracted and dried PA-6 was determined in 0.5 weight percent solution in m-cresol at 20° C.

The determination of the end group concentration was carried out by means of acidimetric titration. The amino end groups were titrated with 0.1-normal ethanolic perchloric acid in m-cresol/isopropanol 2:1 (weight parts) as solvent. The titration of the carboxyl end groups with 0,1-normal benzyl alcoholic potassium hydroxide was carried out in benzyl alcohol as solvent.

The following, extracted PA-6 types chain terminated with acetic acid were utilized as comparative materials:

Fiber Type (No.5) with a relative solvent viscosity of 1.78 and a carboxyl or, respectively, amino end group concentration of 56 or, respectively, 46 meq/kg;

Injection Molding Type (No. 6) with a relative viscosity of 1.77 and a carboxyl or, respectively, amino end group concentration of 57 or, respectively, 29 meq/kg.

The abbreviations used in the examples having the following meaning:

LC6 Caprolactam

TPS Terephthalic acid

DMAPA 3-(dimethylamino)-1-propylamine

TMPA 4-amino-2,2,6,6-tetramethyl piperidine

PEA 2-piperidino ethylamine

RV Relative solution viscosity (0.5 weight percent/m-cresol)

COOH Carboxyl end group concentration

Amine Amino end group concentration

KSZ Notch impact strength (in the dry condition)

$T_K$ Cooling time $T_Z$ Cycle time

Said diamines were obtained from the FLUKA company (Buchs, Switzerland)

EXAMPLES

1. Polymers

The following Table 1, Examples 1a,1b,2a,2b,3 and 4 are referenced with respect thereto.

TABLE 1

Characterization of the inventive PA-6 (extracted and dried)

| | Raw Materials | | | | | | | | | | |
|---|---|---|---|---|---|---|---|---|---|---|---|
| | LC-6 | | TPS [kg] | DMAPA | | TMPA | | PEA | | COOH | Amine[1)] |
| Examp. | [kg] | Wt. % | Wt. % | [kg] | Wt. % | [kg/] | Wt. % | [kg] | Wt. % | RV | [meq/kg] | [meq/kg] |
| 1a | 45 | 99.436 | 0.20 | 0.442 | 0.055 | 0.122 | | | | | 1.765 | 78 | 42 |
| 1b | 45 | 99.436 | 0.20 | 0.442 | 0.055 | 0.122 | | | | | 1.753 | 79 | 45 |
| 2a | 45 | 99.373 | 0.20 | 0.442 | | | 0.084 | 0.185 | | | 1.793 | 74 | 38 |

TABLE 1-continued

Characterization of the inventive PA-6 (extracted and dried)

| | Raw Materials | | | | | | | | | | | |
|---|---|---|---|---|---|---|---|---|---|---|---|---|
| | TPS | | | | | | | | | | | |
| | LC-6 | [kg] | | DMAPA | | TMPA | | PEA | | | COOH | Amine[1] |
| Examp. | [kg] | Wt. % | Wt. % | [kg] | Wt. % | [kg/] | Wt. % | [kg] | Wt. % | RV | [meq/kg] | [meq/kg] |
| 2b | 45 | 99.373 | 0.20 | 0.442 | | 0.084 | 0.185 | | | 1.774 | 76 | 42 |
| 3 | 45 | 99.405 | 0.20 | 0.442 | | | | 0.069 | 0.153 | 1.755 | 77 | 43 |
| 4 | 45 | 99.403 | 0.20 | 0.442 | 0.028 | 0.062 | 0.042 | 0.093 | | 1.763 | 79 | 44 |

[1]The measured amino end group concentrations are apparently composed of the concentration of primary amino groups (—NH$_2$) in all instances, tertiary amino groups ((CH$_3$C)$_2$—N— in Example 1a) and 1b) or, respectively, piperidino end groups in Example 3) and secondary amino groups (2,2,6,6-tetramethyl-4-piperidyl radicals in the case of Examples 2a and 2b). In the case of Example 4, all said types of amino end groups occur.

2. Manufacture and Testing of Modified Injection Molding Compounds

2.1 Flame-Retardant Products 90 weight parts PA-6 are mixed with 10 weight parts fine-particulate melamine cyanurate in a twin-screw extruder ZSK-30 (L/D=42) from Werner & Pfleiderer (Stuttgart, Germany) at extruder temperatures of 240°–250° C. and a throughput of a total of 9 kg/h in the melt (PA-6).

The PA-6 granulate is dry-blended with the melamine cyanurate before the compounding step.

After cooling of the strands in a water bath, the finished mixture is granulated or pelletized and then dried in a vacuum for 24 hours at 110° C.

The dried pellets are injection molded to form 127×12.7× 0.8 (mm) test rods and are subjected to the combustion test according to UL-94.

The results of these tests may be found in Table 2:

TABLE 2

UL-94 Test of PA6/melamine cyanurate 90/10 Mixtures

| Example | PA-6 Employed | Result |
|---|---|---|
| 5 | from Example 3 | V0 |
| 6 (Comparative Example) | Fiber Type (No. 5) | V2 |
| 7 (Comparative Example) | Injection Molding Type (No. 6) | V0 |

The results demonstrate the inventive PA-6 according to Example 3 as extremely well-suite for this kind of modification.

2.2 Impact-Strength-Modified Products 80 weight parts PA-6 are mixed together with 20 weight parts of an ethylene/propylene copolymer grafted with 0.5 weight percent maleic anhydride (mol ratio ethylene/propylene: 80/20; Mooney viscosity: 21 ML1+4 at 125° C.)), and 1 weight part glycerine monostearate from AG Vogel (Zurich, Switzerland) as well as 0.63 weight parts white pigment Sachtolith HDS® from the Sachtleben company (Duisburg, Germany) and 0.05 weight parts color black FW2 from Degussa (Baar, Switzerland) in a twin-screw extruder (WPFZSK-30; L/D=42). The extruder temperature amounts to 250°–260° C. and the throughput to 10 kg/hour.

The mixtures were granulated and dried in the same way as set forth above for the flame-retardant products.

The pellets were then injection molded to form test pieces for the measuring of the notch impact strength according to Charpy, in the dry condition, test pieces were manufactured according to ISO-179 (80×10×4 mm rods; mass temperature: 265° C.; mold temperature: 80° C.).

For testing their processability, these mixtures were processed to form a complicated injection molded part with long ejection paths and core (part in the shape of the company logo with rod gating and a shot weight of about 105 g). The mass temperature in all was adjusted to 265° C., the molding temperature was constantly 80° C. The cooling time (including dwell pressure time) minimally required for assuring perfect unmolding (no warping, no deep ejector marks on the parts) was measured in these processing tests. Additionally, the appearance of the dark gray injection molded parts was evaluated visually.

The results may be found in the following Table 3 and confirm the advantageous properties of the inventive polyamide 6.

TABLE 3

Test of the Impact-Strength-Modified Products

| | | KSZ [kJ/m$^2$] | | $T_K$ | $T_Z$ | Processing Test Appearance of the injection |
|---|---|---|---|---|---|---|
| Example | PA-6 Employed | 23° | –30° | (sec) | (sec) | molded parts |
| 8 | from Example 4 | 70 | 15 | 85 | 96 | perfect, uniform coloring |
| 9 (Comp. Example) | Fiber Type (No. 5) | 83 | 17 | 95 | 107 | non-uniform coloring, i.e. light/dark grey veils and spots |
| 10 (Comp. Example) | Injection Molding Type (No. 6) | 75 | 15 | 83 | 95 | perfect, uniform coloring |

3. Fiber Manufacture and Testing of the Dye Affinity

The individual PA-6 types are spun on a spinning system:

Throughput: 1.5 g per minute and capillary

Melt temperature: 262–264° C.

Thread cooling: cross flow fanning

Haul-off rate: 4,200 m per minute

In addition to the inventive products 1a/b (Examples 1a and 1b) and 2a/b (Examples 2a and 2b), respectively as granulate mixtures, the fiber type (No.5) and the injection molding type (No.6) were spun for comparison.

The coloring with Irgalan brown 2RL (Ciba Geigy, Basel, Switzerland) yielded good results for 1a/b, 2a/b and the comparison material No.5 and a moderate result for the injection molding type No.6 with respect to depth and uniformity of color.

We claim:

1. Chain-regulated, hydrolytically polymerized polyamide 6, characterized in that the polymerization of caprolactam (I) is carried out with 0.1–0.7 weight percent of an aromatic dicarboxylic acid (II), 0.01–0.7 weight percent of an aliphatic or cycloaliphatic diamine (III) that carries a primary and a tertiary amino group, and/or 0.01–0.7 weight percent 4-amino-2,2,6,6-tetraalkyl piperidine (IV), whereby the quantities of constituents I through IV add up to 100 weight percent and the quantity of the constituents III and/or IV amounts to 0.01–0.7 weight percent.

2. Chain-regulated polyamide 6 according to claim 1, characterized in that the amount of the aromatic dicarboxylic acid (II) amounts to 0.2–0.6 weight percent.

3. Chain-regulated polyamide 6 according to claims 1 or 2, characterized in that the quantity of the constituents III and/or IV respectively amounts to 0.01–0.6 weight percent.

4. Chain-regulated polyamide 6 according to claims 1 or 2, characterized in that the total quantity of constituents III and/or IV amounts to 0.05–0/6 weight percent.

5. Chain-regulated polyamide 6 according to claims 1 or 2, characterized in that terephthalic acid and/or isophthalic acid is employed as aromatic dicarboxylic acid (II).

6. Chain-regulated polyamide 6 according to claims 1, characterized in that 4-amino-2,2,6,6-tetramethylpiperidine is employed as constituent IV.

7. Chain-regulated polyamide 6 according to claim 3 characterized in that 4-amino-2,2,6,6-tetramethylpiperidine is employed as constituent IV.

8. Chain-regulated polyamide 6 according to claim 4 characterized in that 4-amino-2,2,6,6-tetramethylpiperidine is employed as constituent IV.

* * * * *